US009443223B2

(12) United States Patent
Sutton-Shearer

(10) Patent No.: US 9,443,223 B2
(45) Date of Patent: Sep. 13, 2016

(54) SYSTEM AND METHOD FOR HOSTING A SOCIAL NETWORKING WEBSITE HAVING A THEME OF ACHIEVEMENT

(75) Inventor: Drake Sutton-Shearer, Los Angeles, CA (US)

(73) Assignee: Bimodal LLC, Wilmington, DE (US)

( * ) Notice: Subject to any disclaimer, the term of this patent is extended or adjusted under 35 U.S.C. 154(b) by 1503 days.

(21) Appl. No.: 12/683,694

(22) Filed: Jan. 7, 2010

(65) Prior Publication Data
US 2011/0166941 A1 Jul. 7, 2011

(51) Int. Cl.
*G06Q 99/00* (2006.01)
*G06Q 10/10* (2012.01)
*G06Q 30/02* (2012.01)
*G06Q 30/06* (2012.01)

(52) U.S. Cl.
CPC .......... *G06Q 10/10* (2013.01); *G06Q 30/0241* (2013.01); *G06Q 30/0257* (2013.01); *G06Q 30/0273* (2013.01); *G06Q 30/06* (2013.01)

(58) Field of Classification Search
CPC .............................. G06Q 50/01; H04L 51/32
USPC ........................................................ 709/204
See application file for complete search history.

(56) References Cited

U.S. PATENT DOCUMENTS

| 5,227,874 | A | 7/1993 | Von Kohorn | |
|---|---|---|---|---|
| 6,729,884 | B1 | 5/2004 | Kelton et al. | |
| 7,457,767 | B1 | 11/2008 | Dunsmore et al. | |
| 7,580,861 | B1 | 8/2009 | Song | |
| 7,818,344 | B2 | 10/2010 | McVeigh et al. | |
| 8,190,733 | B1 | 5/2012 | Hoffman et al. | 709/224 |
| 8,219,454 | B2 | 7/2012 | Karlsson | |
| 2002/0065881 | A1* | 5/2002 | Mansikkaniemi et al. | 709/204 |
| 2004/0243468 | A1 | 12/2004 | Cohagan et al. | |
| 2006/0195362 | A1 | 8/2006 | Jacobi et al. | |
| 2007/0065206 | A1 | 3/2007 | Silverbrook et al. | |
| 2007/0130001 | A1 | 6/2007 | Jung et al. | |
| 2007/0219994 | A1 | 9/2007 | Lemelson | 707/7 |
| 2008/0040653 | A1 | 2/2008 | Levine | |
| 2008/0071612 | A1* | 3/2008 | Mah et al. | 705/14 |

(Continued)

FOREIGN PATENT DOCUMENTS

JP 2006202005 8/2006

OTHER PUBLICATIONS

Van Veldhoven, Erwin R., Martijn H. Vastenburg, and David V. Keyson. "Designing an interactive messaging and reminder display for elderly." European Conference on Ambient Intelligence. Springer Berlin Heidelberg, 2008.*

(Continued)

*Primary Examiner* — Kathleen Palavecino
*Assistant Examiner* — Maame Ofori-Awuah
(74) *Attorney, Agent, or Firm* — Duncan Galloway Egan Greenwald, PLLC; Kevin T. Duncan

(57) ABSTRACT

A social networking website is themed toward achievements and/or accomplishments of users. As such, the social network may provide users with a unitary platform over which users can share a variety of different accomplishments of a variety of different accomplishment types, in a variety of categories, and/or involving a variety of different entities. Users may further observe accomplishments or achievements of other users via the social network despite the disparate nature of the accomplishments, accomplishment types, categories of activities involved in the accomplishments, and/or the entities involved in the accomplishments.

19 Claims, 7 Drawing Sheets

(56) References Cited

U.S. PATENT DOCUMENTS

| | | |
|---|---|---|
| 2008/0082373 A1 | 4/2008 | Durocher et al. |
| 2008/0189188 A1 | 8/2008 | Morgenstern ............ 705/26 |
| 2008/0189189 A1* | 8/2008 | Morgenstern ............ 705/26 |
| 2008/0302872 A1 | 12/2008 | Tate |
| 2009/0083627 A1* | 3/2009 | Onda et al. ............ 715/708 |
| 2009/0117883 A1 | 5/2009 | Coffing et al. |
| 2009/0198623 A1 | 8/2009 | Rubinstein |
| 2009/0222424 A1 | 9/2009 | Van ............ 707/3 |
| 2009/0271712 A1* | 10/2009 | Ligh et al. ............ 715/752 |
| 2009/0288012 A1 | 11/2009 | Hertel et al. |
| 2010/0049657 A1 | 2/2010 | Aichroth et al. |
| 2010/0208662 A1 | 8/2010 | Fuste Vilella et al. ....... 370/328 |
| 2010/0250531 A1 | 9/2010 | Andersen et al. |
| 2010/0282764 A1 | 11/2010 | Mikl |
| 2011/0025707 A1 | 2/2011 | Fujioka |
| 2011/0078030 A1 | 3/2011 | Borst et al. |
| 2011/0087769 A1* | 4/2011 | Holmes et al. ............ 709/224 |
| 2011/0099070 A1 | 4/2011 | Eliason |
| 2011/0106696 A1 | 5/2011 | Seven |
| 2011/0166941 A1 | 7/2011 | Sutton-Shearer et al. |
| 2011/0167125 A1* | 7/2011 | Achlioptas ............ 709/206 |
| 2011/0271328 A1 | 11/2011 | Sutton-Shearer ............ 726/4 |
| 2011/0302037 A1 | 12/2011 | Sutton-Shearer ............ 705/14.66 |
| 2012/0005106 A1 | 1/2012 | Famous |
| 2012/0040653 A1 | 2/2012 | Mendis |
| 2012/0101886 A1 | 4/2012 | Subramanian et al. |
| 2012/0109785 A1 | 5/2012 | Karlsson |
| 2012/0150669 A1 | 6/2012 | Langley et al. |
| 2012/0231891 A1 | 9/2012 | Watkins, Jr. et al. |
| 2012/0239478 A1 | 9/2012 | Yang et al. |

OTHER PUBLICATIONS

Calderon, "How to Protect Your Privacy With Facebook's New Privacy Settings in 17 Easy Steps", 2010, http://www.insidefacebook.com/2010/01/19/how-to-protect-your-privacy-with-facebook%E2%80%99s-new-privacy-settings-in-17-easy-steps/.

Author Unknown, "Disney Interactive Studios Releases Disney Fairies: Tinker Bell for Nintendo DS(TM)", Business Wire, Oct. 28, 2008.

Chang, "Virtual Goods Give Brands a New Way to Play in Gaming; Games Offer Complimentary Use and Free Products in Exchange for Watching Advertisements", Advertising Age, vol. 80 (25), 2009, p. 12.

Nine Inch Nails, "The Downward Spiral Back to Black Limited Edition", Vinyl LP Release, Jun. 29, 2010.

Nine Inch Nails, "The Downward Spiral Back to Black Limited Edition", Website for code redemption <http://www.backtoblackvinyl.com/vinyl/Nine_Inch_Nails-The_Downward_Spiral_Limited_Edition.php>, Feb. 15, 2012.

Nincatalog. Online Catalog entry fo Nine Inch Nails, "The Downward Spiral Back to Black Limited Edition", [Vinyl LP Release], <http://www.nincatalog.com/item.asp?key=01-00887>, Feb. 14, 2012.

PR Web, "The Gift App. Launches Branded Gifts on Facebook", 2011, http://www.prweb.com/releases/2011/02/prweb5076934.htm, 2 pages.

* cited by examiner

SYSTEM AND METHOD FOR HOSTING A SOCIAL NETWORKING WEBSITE HAVING A THEME OF ACHIEVEMENT

FIELD OF THE INVENTION

The invention relates to a social networking website having a theme of achievement or accomplishment that provides for users to exchange certificates between each other that are viewable on the social network and can be printed for display in the real world. Further, the social networking website may provide for users to leave each other messages on message boards that are attached to the message boards with virtual fasteners associated with advertisers, the virtual fasteners being selected by the users rather than the advertisers and/or the social network operator.

BACKGROUND OF THE INVENTION

Social networking websites exist. Generally, these websites include category divisions (e.g., for individuals, groups, and/or other entities), mechanisms for communicatively connecting people and/or groups, a recommendation system linked to trust, profiles for individuals and/or groups involved in the social network service, and/or other features. These websites enable users to communicate with each other, build their social networks, exchange virtual goods, and/or participate in other activities.

SUMMARY

One aspect of the invention relates to a social network website. The social network website may be themed toward achievements and/or accomplishments of users. As such, the social network may provide users with a unitary platform over which users can share a variety of different accomplishments of a variety of different accomplishment types, in a variety of categories, and/or involving a variety of different entities. Users may further observe accomplishments or achievements of other users via the social network despite the disparate nature of the accomplishments, accomplishment types, categories of activities involved in the accomplishments, and/or the entities involved in the accomplishments.

In some implementations, a system configured to provide the social networking website may include a server and/or other components. The server may be configured to host webpages of the social networking website. The webpages may define views of the social network. The webpages may be transmitted by the server to client computing platforms, where the client computing platforms may render views of the social network defined by the received webpages. The server may be configured to execute one or more of a user profile module, a user wall module, a profile management module, an achievement module, a gift module, a certificate creation module, a certificate transmission module, a certificate acceptance module, a message creation module, a message fastening module, and/or other modules.

The user profile module may be configured to manage user profiles associated with users of the system. The user profiles may include identification information, contact information, login information, relationship information, and/or other information. Identification information may identify individual users.

The user wall module may be configured to assemble webpages defining views of walls associated with individual users. As used herein, the term "wall" may refer to a homepage of a user in the social networking website that is accessible to other users (e.g., the wall is outward facing). A wall may include information that a user wants other users to have access to. The webpages assembled by the user wall module may be served to client computing platforms in response to requests for the webpages.

The information displayed on a wall of a user may include information identifying the user, content (e.g., photos, video, audio, prose) submitted by the user, alternative information sources about the user (e.g., an outside uniform resource locator), and/or other information. The wall may include representations of categories of activities, accomplishments, and/or achievements. The categories may include categories of activities, accomplishments, and/or achievements in which the user participates and/or has an interest in. The wall may include representations of gifts given to the user by other users. The wall may include representations of achievements performed by the user, or in which the user was involved. The wall may include representations of certificates. These may include certificates issued by the user and/or certificates received by the user.

The wall may include representations of ratings by other users of the wall, the user associated with the wall, and/or other aspects of the user. The ratings may reflect approval or disapproval, like or dislike, acceptance or rejection. In some implementations, the ratings include binary ratings (e.g., thumbs-up/thumbs-down). In some implementations, the ratings include ratings with more levels (e.g., letter grade, rating 1-10, and/or other ratings schemes).

The profile management module may be configured to assemble webpages that include a user interface having selectable controls that enable users to manage their profiles. For example, the user interface may enable users to edit user information, configure their walls, and/or otherwise manage their profiles. The selectable controls shown in the user interface provided by the profile management module may include a categories control, a certificates control, an achievements control, one or more relationship controls, a user information control, a wall configuration control, a user content control, and/or other controls.

The achievement module may be configured to enable users to manage their achievements. As such, the achievement module may be configured to assemble webpages that provide controls to users by which users can add, delete, and/or edit achievements. The webpages assembled by the achievement module may be accessed by selection of an achievements control provided by the profile management module.

The user interface defined by webpages assembled by the achievement module may include controls by which the user can add an achievement to his profile and/or wall. This user interface may include one or more of a title field, a description field, digital content entry controls, a date selection control, a category selection control, and/or other controls. The title field may be configured to receive a title for the achievement from the user. The description field may be configured to receive a description of the achievement from the user. The digital content entry controls may be configured to enable the user to provide digital content (e.g., images, video, audio, and/or other digital content) associated with the achievement to the system. The date selection control may be configured to receive a date associated with the achievement from the user. The category selection control may be configured to receive a category in which the achievement should be grouped.

The gift module may be configured to enable users to buy and/or send gifts to each other. To accomplish this, the gift module may be configured to assemble webpages including selectable controls by which a user purchases and/or configures a virtual gift for another user. The selectable controls may further include controls for indicating the user to which a given gift should be sent, and controls to initiate sending of the gift. The selectable controls may include controls by which the user giving the gift pays for the virtual gift. The virtual gift may be purchased with virtual currency, real world currency, and/or other consideration.

In some implementations, a virtual gift may include a virtual good that will be represented in the view of the wall defined by webpages assembled by the user wall module for the receiving user. The representation of the virtual gift may include at least a portion of the representation that is configured by the virtual gift provider (e.g., the operator of the system). This portion(s) may be selectable by the giving user, however, such selection may be from a set of predetermined options presented to the user by the gift module. For example, the giving user may select a background or frame of a virtual gift. The representation of the virtual gift may include at least a portion of the representation that can be defined more substantially by the giving user. For instance, the gift module may assemble a webpage including a user interface with controls by which the giving user can input content to be included in the virtual gift. The content may include one or more of text, an image, video, audio, and/or other content input by the user.

The certificate creation module may be configured to assemble webpages defining a user interface by which users can generate certificates for other users. The certificates may affirm or certify achievements or activities by the users receiving the certificates. The certificates may identify the generating users. The identification of the generating user in a certificate may serve to verify the authenticity and/or value of the certificate.

The user interface defined by webpages assembled by the certificate creation module may include controls by which the user generating the certificate may customize the certificate. This may include entering content, such as text and/or images, to the certificate, configuring the content (e.g., position, size, orientation, color, font, and/or other configuration parameters), and/or otherwise controlling the appearance of the certificate. The controls may include controls by which electronic files are uploaded so that content included in the electronic files will be included in the certificate. The controls may include controls by which the generating user may indicate a category for the certificate being created.

The certificate transmission module may be configured to transmit generated certificates to the appropriate users. Transmission of a given certificate to a user may result in display of the transmitted certificate on the wall of user. The certificates may be defined by the certificate creation module such that upon receiving a certificate, a user may print out a copy of the certificate that can be displayed in the real world (e.g., framed and hung).

The certificate acceptance module may be configured to enable users receiving certificates to accept or reject the certificates. For example, the certificate acceptance module may assemble a webpage defining a view that includes a preview of a certificate transmitted to a given user by the certificate transmission module. The view may include a preview of the certificate transmitted to the user, and selectable control(s) by which the user may selectively accept or reject the transmitted certificate.

In some implementations, the walls of users of the system may include message boards on which users can leave messages for each other. The message creation module may be configured to enable users to generate messages that can be left on message boards. The message fastening module may be configured to enable users to fasten generated messages to selected message boards.

A given message board may be represented as having an appearance that corresponds a surface in the real world configured for removable attachment of messages. For example, the message board may be represented as having an appearance that corresponds to one or more of a cork board, a refrigerator, a whiteboard, a blackboard, a tack board, a felt board, and/or other surfaces configured for removable attachment of messages. The messages may have a finite size and boundaries, and content entered by users.

A representation of a message definition interface may be defined by webpages of walls of users including message boards. The message definition interface may include controls by which a user can define a message for inclusion on a message board. The message definition interface may include a title field and a body field. The title field may be configured to receive a title for the message from the user. The body field may be configured to receive a body for the message from the user.

A view defined by a webpage including a message board may include representations of a plurality of virtual fasteners. The virtual fasteners may be managed by the message fastening module. The virtual fasteners may correspond in appearance to one or more real world objects configured to hold messages in place. For example, the virtual fasteners may correspond in appearance to one or more of a pushpin, a thumbtack, a magnet, a piece of tape, a sticker, and/or other fasteners configured to hold messages in place.

The individual virtual fasteners may include content defined by an advertiser. For example, an individual virtual fastener may include an image defined (e.g., chosen, designed, designated, and/or otherwise defined) by an advertiser. The given virtual fastener may be associated with a uniform resource locator defined by and/or associated with the advertiser that defined the content.

Once a user has generated a message, the user may fasten the message to message board with one of the virtual fasteners. To fasten the message to the message board, the user may select the virtual fastener that he prefers, and may designate a position on the message board at which the message should be fastened. The webpage defining the view of the wall including the message board may then be adjusted to include the message at the designated location. The message may be shown as being held in place on the message board by the selected virtual fastener. Once the message and the virtual fastener are in place, selection of the virtual fastener by any user (e.g., the user that generated the message, the user associated with the message board, another user viewing the message board, and/or other users) may result in a client computing platform being used by the user requesting information from the uniform resource locator associated with the virtual fastener.

As such, the attachment of messages to the message board with virtual fasteners may provide the operator of the social network to obtain advertising revenue with advertisements that are selected and positioned in the webpages of the social networking website by the users themselves. This may stand in contradistinction with conventional websites that position advertisements without input from users on the advertisements that are included and/or the positions of the advertisements.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
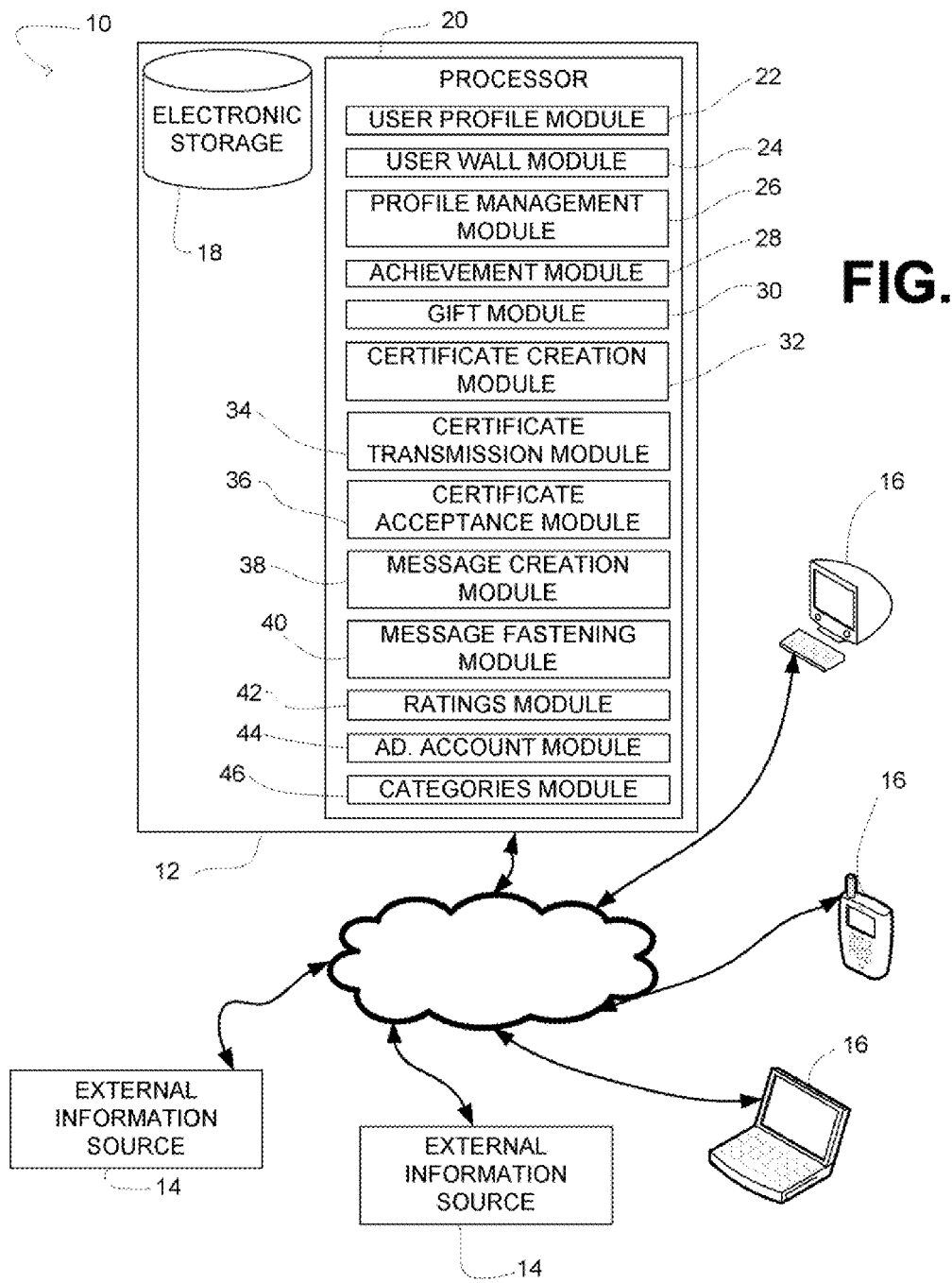
FIG. 1 illustrates a system configured to provide a social network website to users, in accordance with one or more embodiments of the invention.

FIG. 1 illustrates a system 10 configured to provide a social network website to users. The social network website may be themed toward achievements and/or accomplishments of users. As such, the social network may provide users with a unitary platform over which users can share a variety of different accomplishments of a variety of different accomplishment types, in a variety of categories, and/or involving a variety of different entities. Users may further observe accomplishments or achievements of other users via the social network despite the disparate nature of the accomplishments, accomplishment types, categories of activities involved in the accomplishments, and/or the entities involved in the accomplishments.

As used herein, the term "social network website" may refer to a website providing a social network service. The social network service may include category divisions (e.g., for activities, achievements, individuals, groups, and/or other entities), mechanisms for communicatively connecting people and/or groups, a recommendation system linked to trust, profiles for individuals and/or groups involved in the social network service, and/or other features.

In some implementations, system 10 may include a server 12 and/or other components. The system 10 may leverage one or more external information sources 14. Users may interface with system 10 and/or external information sources 14 via client computing platforms 16. The components of system 10, server 12, external information sources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12, external information sources 14, and/or client computing platforms 16 are operatively linked via some other communication media.

A given client computing platform 16 may include one or more processors configured to execute computer program modules. The computer program modules may be configured to enable one or more users associated with the given client computing platform 16 to interface with system 10 and/or external information sources 14, and/or provide other functionality attributed herein to client computing platforms 16. By way of non-limiting example, the given client computing platform 16 may include one or more of a desktop computer, a laptop computer, a handheld computer, a NetBook, a Smartphone, and/or other computing platforms.

The external information sources 14 may be configured to provide information to system 10. This information may include content, user information, information related to achievements or accomplishments of users, and/or other information.

Generally, server 12 may be configured to host webpages of the social networking website. The webpages may define views of the social network. The webpages may be transmitted by server 12 to client computing platforms 16, where client computing platforms 16 may render views of the social network defined by the received webpages. The webpages may be transmitted by server 12 based on requests to uniform resource locators associated with specific webpages. As used herein, the term "webpage" may refer to an electronic document or file. The electronic document or file may be suitable for transmission over the Internet (and/or other networks) and/or may be accessible by a web browser application executed on client computing platforms 16 such that views of the webpage are displayed on the accessing client computing platform 16. Webpages may be formatted in a mark-up language format, such as HTML, XML, XHTML, and/or other mark-up language formats.

The server 12 may include electronic storage 18, processor 20, and/or other components. It will be appreciated that the illustration of server 12 as a single device is not intended to be limiting. In some implementations, server 12 includes a plurality of devices that cooperate to perform some or all of the functionality attributed herein to server 12.

Electronic storage 18 may comprise electronic storage media that electronically stores information. The electronic storage media of electronic storage 18 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from external information sources 14, information received from client computing platforms 16, and/or other information that enables server 12 to function properly.

Processor 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of a user profile module 22, a user wall module 24, a profile management module 26, an achievement module 28, a gift module 30, a certificate creation module 32, a certificate transmission module 34, a certificate acceptance module 36, a message creation module 38, a message fastening module 40, a user ratings module 42, an advertiser account module 44, a categories module 46, and/or other modules. Processor 26 may be configured to execute modules 22, 24, 26, 28, 30, 32, 34, 36, 38, 40, 42, 44, and/or 46 by software, hardware; firmware; some combination of software, hardware, and/or firmware; and/or other mechanisms for configuring processing capabilities on processor 20.

It should be appreciated that although modules 22, 24, 26, 28, 30, 32, 34, 36, 38, 40, 42, 44, and 46 are illustrated in FIG. 1 as being co-located within a single processing unit, in implementations in which processor 20 includes multiple processing units, one or more of modules 22, 24, 26, 28, 30, 32, 34, 36, 38, 40, 42, 44, and/or 46 may be located remotely from the other modules. In implementations in which server 12 includes a plurality of devices operating in a coordinated manner to provide the functionality described herein with respect to processor 20, some or all of the functionality attributed to one or more of 22, 24, 26, 28, 30, 32, 34, 36, 38, 40, 42, 44, and/or 46 may be provided by the modules executed on separate devices. The description of the functionality provided by the different modules 22, 24, 26, 28, 30, 32, 34, 36, 38, 40, 42, 44, and/or 46 described below is for illustrative purposes, and is not intended to be limiting, as any of modules 22, 24, 26, 28, 30, 32, 34, 36, 38, 40, 42, 44, and/or 46 may provide more or less functionality than is described. For example; one or more of modules 22, 24, 26, 28, 30, 32, 34, 36, 38, 40, 42, 44, and/or 46 may be eliminated, and some or all of its functionality may be provided by other ones of modules 22, 24, 26, 28, 30, 32, 34, 36, 38, 40, 42, 44, and/or 46. As another example, processor 20 may be configured to execute one or more additional modules that may perform some or all of the functionality attributed below to one of modules 22, 24, 26, 28, 30, 32, 34, 36, 38, 40, 42, 44, and/or 46.

The user profile module 22 is configured to manage user profiles associated with users of system 10. The user profiles may include identification information, contact information, login information, relationship information, and/or other information. Identification information may identify individual users. For example the user profile of a given user may include the real name of the corresponding user, a username of the corresponding user, and/or other information identifying the user. The contact information may include information that identifies how users can be contacted. For example, the user profile of the given user may include a telephone number, a mailing address, an email address, an SMS account, and/or other mechanisms for communicating with the given user. Login information may include information used by users to login to system 10 (e.g., password, and/or other login information). The relationship information may identifications of relationships between users (e.g., friendships, teammates, and/or other relationships).

The user wall module 24 is configured to assemble webpages defining views of walls associated with individual users. As used herein, the term "wall" may refer to a homepage of a user in the social networking website that is accessible to other users (e.g., the wall is outward facing). A wall may include information that a user wants other users to have access to. The webpages assembled by user wall module 24 may be served to client computing platforms 16 in response to requests for the webpages.

Figure 2:
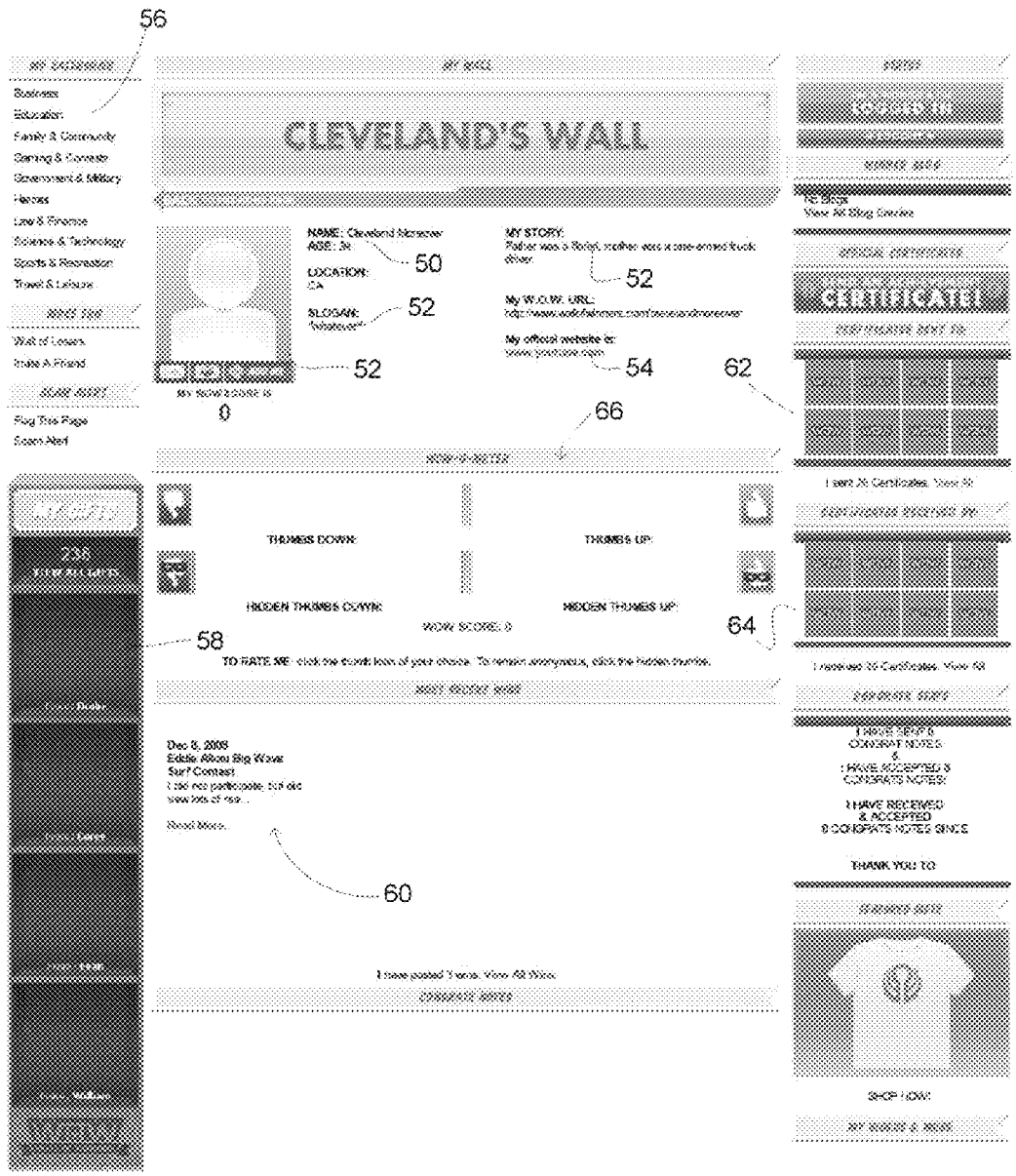
FIG. 2 illustrates a user interface provided by a social network website, according to one or more embodiments of the invention.

FIG. 2 is an exemplary illustration of a view of a wall 48 of a user. The information displayed on wall 48 may include information identifying the user 50, content 52 (e.g., photos, video, audio, prose) submitted by the user, alternative information sources 54 about the user (e.g., an outside uniform resource locator), and/or other information. The wall may include representations of categories 56 of activities, accomplishments, and/or achievements. Categories 56 may include categories of activities, accomplishments, and/or achievements in which the user participates and/or has an interest in. Wall 48 may include representations of gifts 58 given to the user by other users. Wall 48 may include representations of achievements 60 performed by the user, or in which the user was involved. The wall 48 may include representations of certificates. These may include certificates 62 issued by the user and/or certificates 64 received by the user.

The wall 48 may include representations of ratings 66 by other users of wall 48, the user associated with wall 48, content 52, achievements 60, gifts 58, certificates 62 issued by the user, certificates 64 received by the user, and/or other information available on wall 48 or system 10 generally. The ratings may reflect approval or disapproval, like or dislike, acceptance or rejection. In some implementations, ratings 66 include binary ratings (e.g., thumbs-up/thumbs-down). In some implementations, ratings 66 include ratings with more levels (e.g., letter grade, rating 1-10, and/or other ratings schemes).

Figure 3:
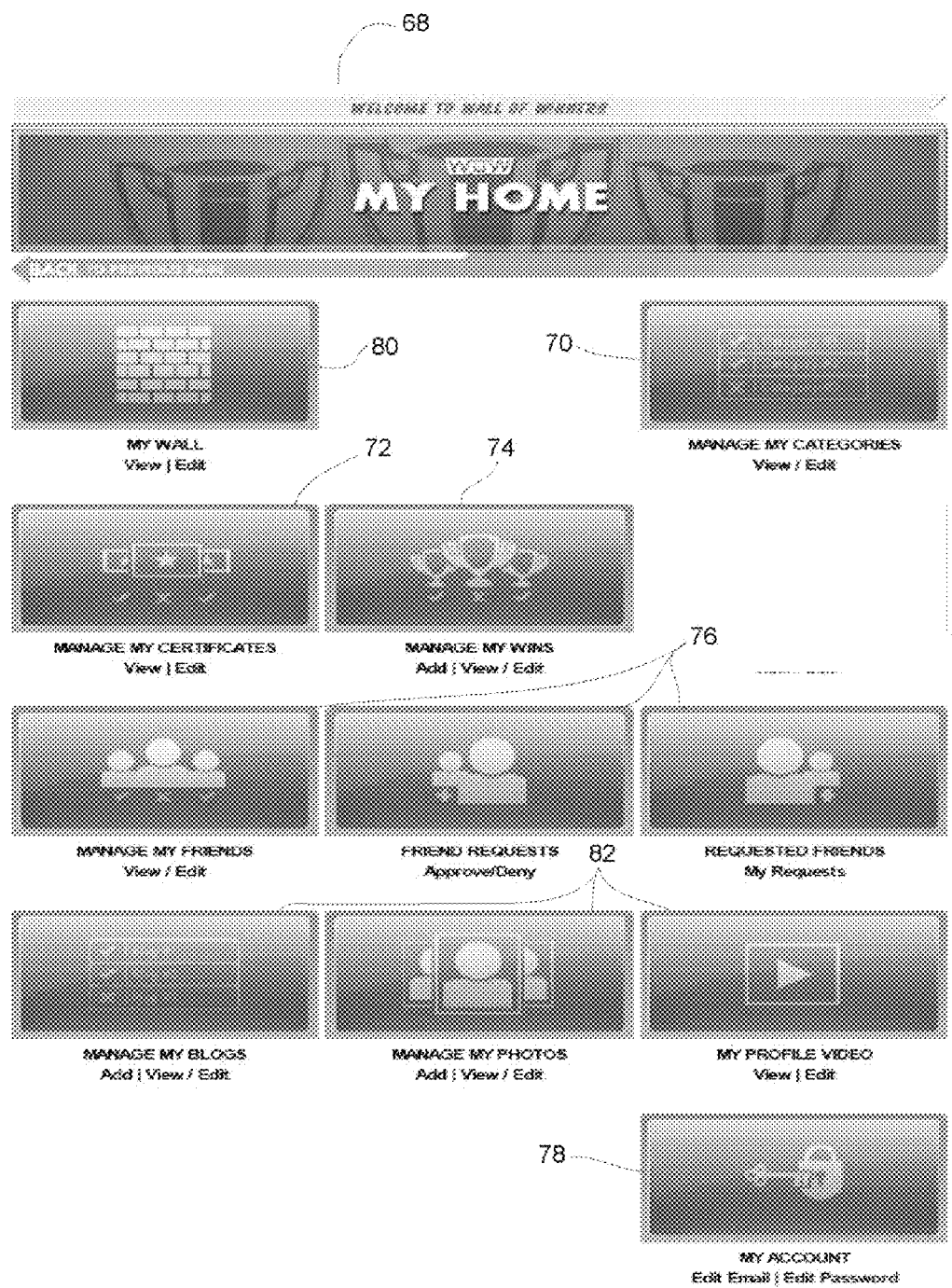
FIG. 3 illustrates a user interface provided by a social network website, according to one or more embodiments of the invention.

Returning to FIG. 1, the profile management module 26 is configured to assemble webpages that include a user interface having selectable controls that enable users to manage their profiles. For example, the user interface may enable users to edit user information, configure their walls, and/or otherwise manage their profiles. FIG. 3 is an exemplary illustration of a view 68 of a webpage assembled by profile management module 26 to enable a user manage his profile. In particular, the view 68 of the webpage shown in FIG. 3 includes a plurality of selectable controls that can be selected by a user to further manage his profile.

The selectable controls shown in view 68 may include a categories control 70, a certificates control 72, an achievements control 74, one or more relationship controls 76, a user information control 78, a wall configuration control 80, a user content control 82, and/or other controls. Selection of categories control 70 may result in a webpage being served to the selecting user that enables the user to add, delete, and/or edit the categories that are associated with his profile (e.g., shown on his wall). Selection of certificates control 72 may result in a webpage being served to the selecting user that provides the user with controls to add, delete, and/or edit certificates associated with his profile (e.g., shown on his wall, sent to other users, and/or other certificates). Selection of achievements control 74 may result in a webpage being served to the selecting user that provides the user with controls to add, delete, and/or edit achievements associated with his profile (e.g., shown on his wall). Selection of one of relationship controls 76 may result in some action being taken with respect to the relationships associated with the user's profile (e.g., accepting a relationship, rejecting a relationship, and/or other actions). Selection of one of relationship controls 76 may result in a webpage being served to the user that provides the user with controls to add, delete, and/or edit relationships. Selection of user information control 78 may result in a webpage being served to the user that provides the user with controls to edit user information. Selection of wall configuration control 80 may result in a webpage being served to the user that provides the user with controls to configure (or reconfigure) his wall. This may include adding items to the wall, deleting items from the wall, rearranging the positions of items on the wall, and/or other actions. Selection of user content control 82 may result in a webpage being served to the user that provides the user with controls to add, delete, and/or edit content associated with the user's profile.

Referring again to FIG. 1, achievement module 28 may be configured to enable users to manage their achievements. As such, achievement module 28 may be configured to assemble webpages that provide controls to users by which users can add, delete, and/or edit achievements. The webpages assembled by achievement module 28 may be accessed by selection of achievements control 74 (shown in FIG. 3 and described above).

Figure 4:
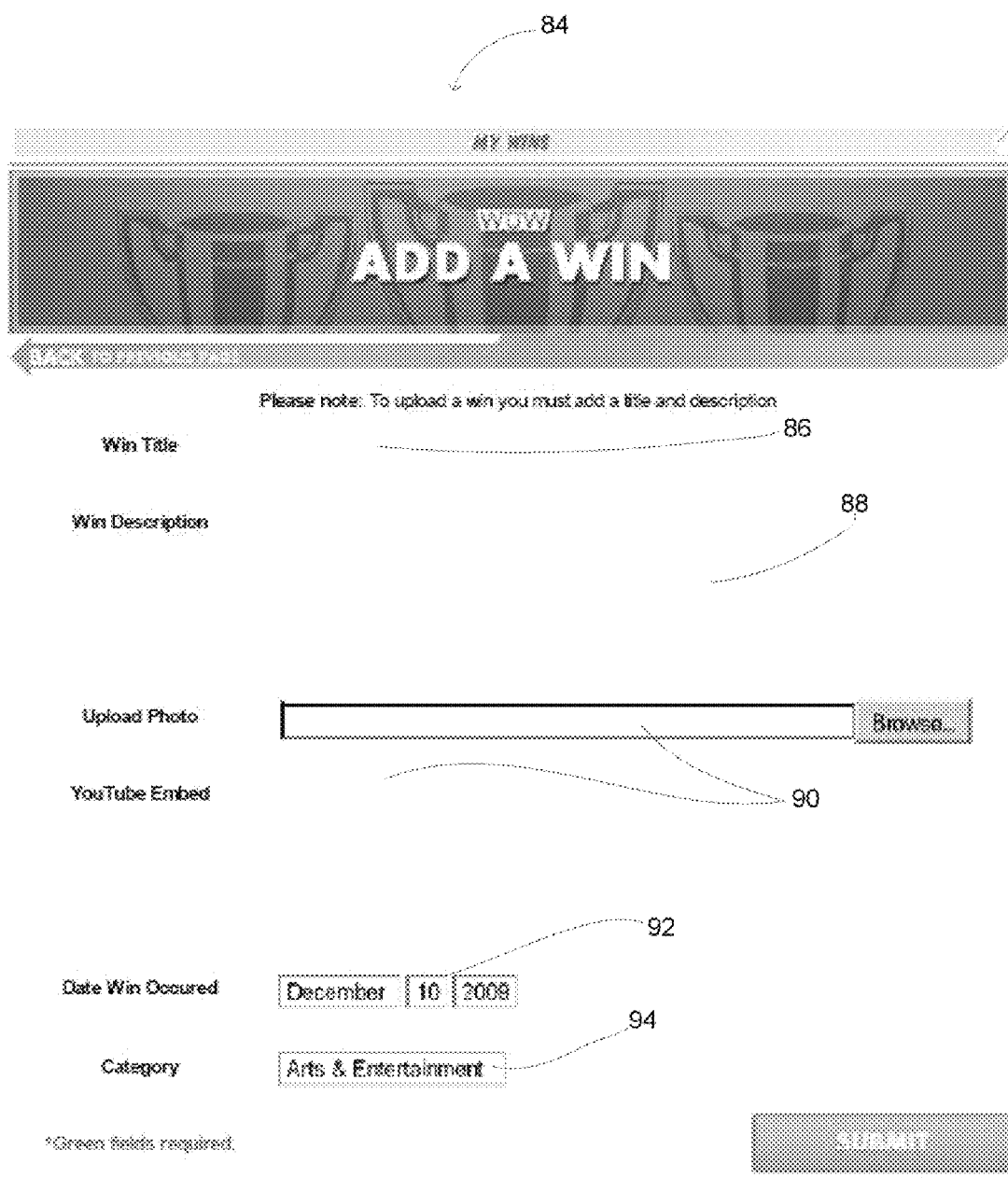
FIG. 4 illustrates a user interface provided by a social network website, according to one or more embodiments of the invention.

FIG. 4 is an exemplary illustration of a view 84 of a webpage that provides controls to a user by which the user can add an achievement to his profile and/or wall. The view 84 may include a title field 86, a description field 88, digital content entry controls 90, a date selection control 92, a category selection control 94, and/or other controls. The title field 86 may be configured to receive a title for the achievement from the user. The description field 88 may be configured to receive a description of the achievement from the user. The digital content entry controls 90 may be configured to enable the user to provide digital content (e.g., images, video, audio, and/or other digital content) associated with the achievement to system 10. The date selection control 92 may be configured to receive a date associated with the achievement from the user. The category selection control 94 may be configured to receive a category in which the achievement should be grouped.

Returning to FIG. 1, the gift module 30 may be configured to enable users to buy and/or send gifts to each other. To accomplish this, gift module 30 may be configured to assemble webpages including selectable controls by which a user purchases and/or configures a virtual gift for another user. The selectable controls may further include controls for indicating the user to which a given gift should be sent, and controls to initiate sending of the gift. The selectable controls may include controls by which the user giving the gift pays for the virtual gift. The virtual gift may be purchased with virtual currency, real world currency, and/or other consideration.

In some implementations, a virtual gift may include a virtual good that will be represented in the view of the wall defined by webpages assembled by user wall module 24 for the receiving user. The representation of the virtual gift may include at least a portion of the representation that is configured by the virtual gift provider (e.g., the operator of system 10). This portion(s) may be selectable by the giving user, however, such selection may be from a set of predetermined options presented to the user by gift module 30. For example, the giving user may select a background or frame of a virtual gift. The representation of the virtual gift may include at least a portion of the representation that can be defined more substantially by the giving user. For instance, gift module 30 may assemble a webpage including a user interface with controls by which the giving user can input content to be included in the virtual gift. The content may include one or more of text, an image, video, audio, and/or other content input by the user.

In some implementations, a user may upload video for inclusion in a virtual gift. The gift module 30 may received the uploaded video, and may compress the video. The compressed video may be re-sized in accordance with a gift to be created (e.g., so that the video fits within the gift properly). The size to which the video is re-sized may be designated by the user, or may be determined automatically from a virtual gift or gift type selected by the user. The gift module 30 may then insert the video into the virtual gift, and the user may be provided with a user interface through which the virtual gift is customizable by the user. In the virtual gift, the video may appear as a video loop. The video loop may play continuously, with corresponding sound being turned selectively off and on by a receiving user. The customization of the virtual gift may include one or more of selecting a frame, coloring, and/or other customizations. The virtual gift may then be transmitted to a receiving user. This may be accomplished, for example, through a virtual storefront at which the giving user designates the receiving user, and provides payment for the virtual gift. In some implementations, upon being designed, the virtual gift may be saved by the user so that the user can transmit the virtual gift to other user(s) at a later time.

The certificate creation module 32 may be configured to assemble webpages defining a user interface by which users can generate certificates for other users. The certificates may affirm or certify achievements or activities by the users receiving the certificates. The certificates may identify the generating users. The identification of the generating user in a certificate may serve to verify the authenticity and/or value of the certificate.

Figure 5:
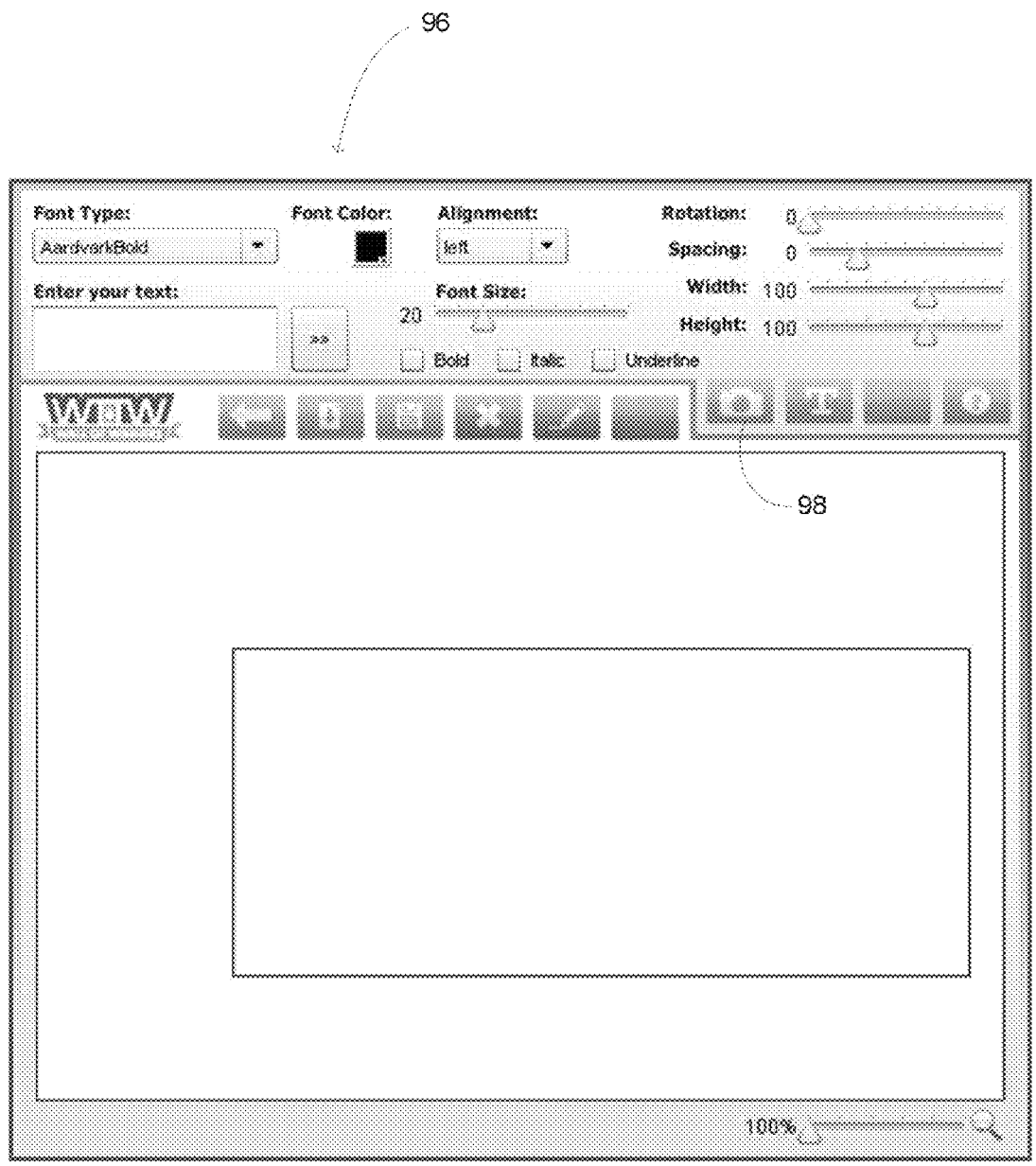
FIG. 5 illustrates a user interface provided by a social network website, according to one or more embodiments of the invention.

FIG. 5 illustrates an exemplary view 96 of a webpage defining the user interface by which users can generate certificates for other users. As can be seen in FIG. 5, view 96 includes controls by which the user generating the certificate may customize the certificate. This may include entering content, such as text and/or images, to the certificate, configuring the content (e.g., position, size, orientation, color, font, and/or other configuration parameters), and/or otherwise controlling the appearance of the certificate. The view 96 may include controls 98 by which electronic files are uploaded so that content included in the electronic files will be included in the certificate. The view 96 may include controls by which the generating user may indicate a category for the certificate being created.

In some implementations, the user interface provided in view 96 may enable a creating user to attach vouchers to certificates being generated. The vouchers may be redeemable on the social network, in other virtual environments, in the real world, and/or otherwise redeemed. Vouchers redeemable on the social network may be redeemed for virtual goods on the social network (e.g., virtual gifts, accessories for a user's wall, and/or other virtual goods). Vouchers redeemable in the real world may be printed out and redeemed at brick-and-mortar retailers, and/or redeemed in the real world through other mechanisms. Access to a voucher may be provided via a uniform resource locator included in a certificate. By selecting the uniform resource locator, the users browser may be directed to the uniform resource locator, at which the voucher is available.

In addition to creating certificates, the user interface provided in view 96 may be used to generate templates for certificates. For example, a template for a certain type of achievement, a template for certificates from a certain entity or user, a template for a specific user or set of users, and/or other templates may be generated. Such templates may be used to streamline the generation of multiple certificates having similar features. In some implementations, templates created by one user may be shared with other users. This may include sharing templates with a specific set of one or more other users, or sharing templates generally with other users of the social network.

Referring back to FIG. 1, certificate transmission module 34 may be configured to transmit generated certificates to the appropriate users. Transmission of a given certificate to a user may result in display of the transmitted certificate on the wall of user. The certificates may be defined by certificate creation module 32 such that upon receiving a certificate, a user may print out a copy of the certificate that can be displayed in the real world (e.g., framed and hung).

The certificate acceptance module 36 may be configured to enable users receiving certificates to accept or reject the certificates. For example, the certificate acceptance module 36 may assemble a webpage defining a view that includes a preview of a certificate transmitted to a given user by certificate transmission module 34. The view may include a preview of the certificate transmitted to the user, and selectable control(s) by which the user may selectively accept or reject the transmitted certificate.

In some implementations, the walls of users of system 10 may include message boards on which users can leave messages for each other. The message creation module 38 may be configured to enable users to generate messages that can be left on message boards. The message fastening module 40 may be configured to enable users to fasten generated messages to selected message boards.

Figure 6:
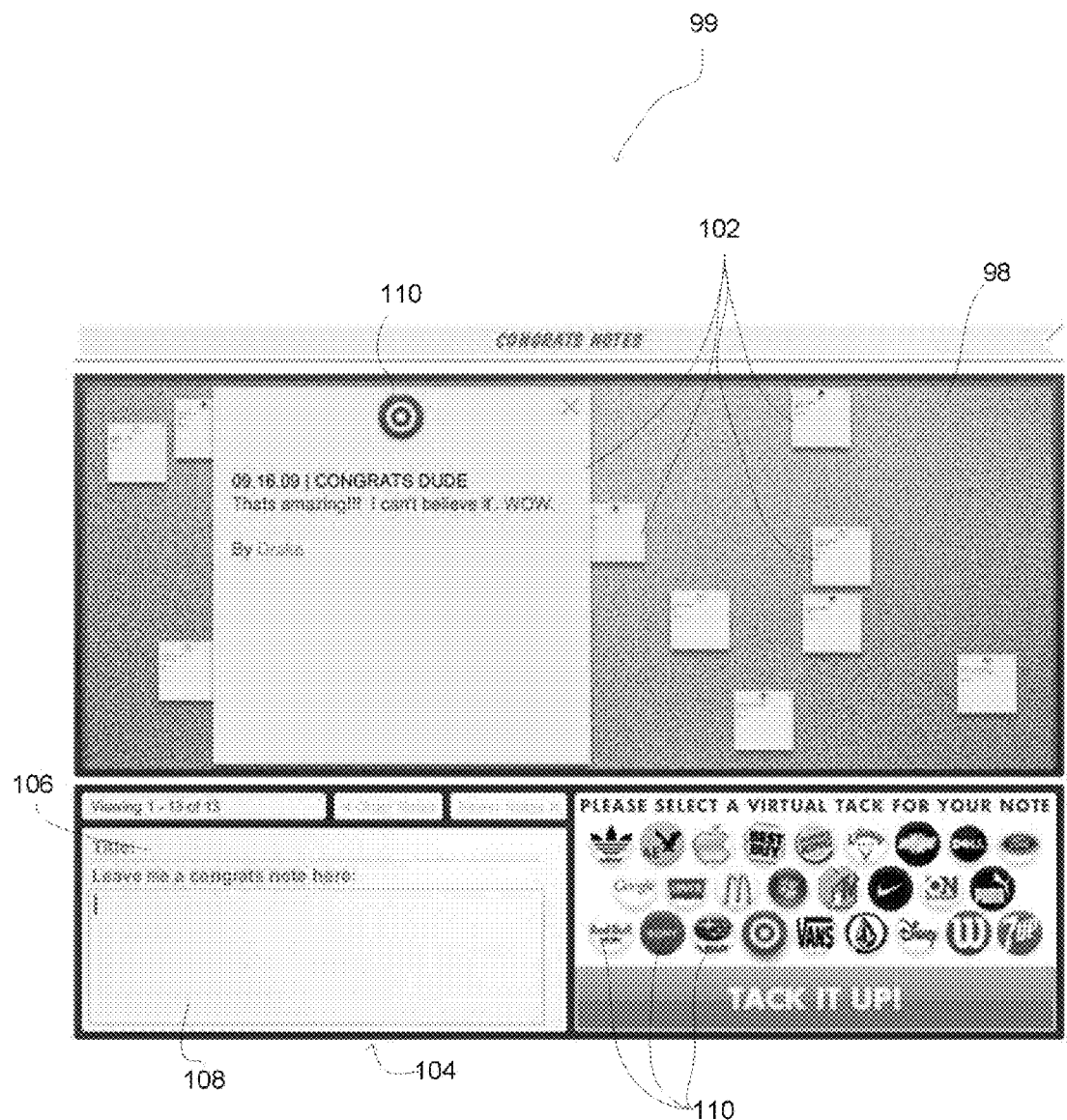
FIG. 6 illustrates a user interface provided by a social network website, according to one or more embodiments of the invention.

By way of non-limiting example, FIG. 6 illustrates a view 99 of a portion of a webpage defining a wall of a user including a message board 100. The message board 100 may be represented in view 99 as having an appearance that corresponds a surface in the real world configured for removable attachment of messages. For example, message board 100 may be represented as having an appearance that corresponds to one or more of a cork board, a refrigerator, a whiteboard, a blackboard, a tack board, a felt board, and/or other surfaces configured for removable attachment of notes 102. As can be seen in FIG. 6, a plurality of messages 102 may be represented in view 99 as being attached to message board 100. The messages 102 have a finite size and boundaries, and content entered by users.

In view 99, a message definition interface 104 may be shown. The message definition interface 104 may include controls by which a user can define a message for inclusion on message board 100. The message definition interface 104 may include a title field 106 and a body field 108. The title field 106 may be configured to receive a title for the message from the user. The body field 108 may be configured to receive a body for the message from the user.

View 99 may include representations of a plurality of virtual fasteners 110. The virtual fasteners 110 may be managed by a message fastening module similar to or the same as message fastening module 40 (shown in FIG. 1).

The virtual fasteners 110 correspond in appearance to one or more real world objects configured to hold messages in place. For example, virtual fasteners 110 may correspond in appearance to one or more of a pushpin, a thumbtack, a magnet, a piece of tape, a sticker, and/or other fasteners configured to hold messages in place.

The individual virtual fasteners 110 may include content defined by an advertiser. For example, in view 99, each of virtual fasteners 110 includes an image defined (e.g., chosen, designed, designated, and/or otherwise defined) by an advertiser. The individual virtual fasteners 110 may be associated with a uniform resource locator defined by and/or associated with the advertiser that defined the content.

Once a user has generated a message, the user may fasten the message to message board 100 with one or virtual fasteners 110. To fasten the message to message board 100, the user may select the virtual fastener 110 that he prefers, and may designate a position on message board 100 at which the message should be fastened. The webpage defining view 99 may then be adjusted to include the message at the designated location. The message may be shown as being held in place on message board 100 by the selected virtual fastener 110. Once the message and virtual fastener 110 are in place, selection of the virtual fastener 110 by any user (e.g., the user that generated the message, the user associated with message board 100 shown in view 99, another user viewing message board 100, and/or other users) may result in a client computing platform being used by the user to view message board 100 to request information from the uniform resource locator associated with virtual fastener 110.

As such, the attachment of messages to message board 100 with virtual fasteners 110 may provide the operator of the social network to obtain advertising revenue with advertisements that are selected and positioned in the webpages of the social networking website by the users themselves. This may stand in contradistinction with conventional websites that position advertisements without input from users on the advertisements that are included and/or the positions of the advertisements.

Referring back to FIG. 1, user ratings module 42 may be configured to enable users to rate other users, the walls, achievements, certificates, content, and/or messages of other users, and/or other aspects of other users in the social network. The ratings received by users may be displayed in their walls (e.g., as defined by the webpages assembled by user wall module 24). The ratings of aspects of users and/or their walls or profiles in system 10 may include ratings made in accordance with a binary rating scheme (e.g., thumbs-up/thumbs-down), and/or ratings made in accordance with a more nuanced rating scheme (e.g., letter grades, 1-10, and/or other rating schemes).

In some implementations, user ratings module 42 may organize users based on the ratings that they have received. For example, user ratings module 42 may order users based on their respective ratings. These orderings may be inclusive across the social network, and/or may be segmented (e.g., according to common friends, category, associated with common group(s), based on demographic user information, and/or otherwise segmented).

The advertiser account module 44 may be configured to keep track of monetary amounts owed by advertisers. One aspect of this determination may be the use of virtual fasteners on the message boards of the walls of users. The amount of money that an advertiser owes may be based on the number of virtual fasteners associated with the advertiser that are selected to attach messages to message boards on the social network. The amount owed may be adjusted based on the ratings of the users (e.g., as managed by user ratings module 42) whose walls virtual fasteners associated with the advertiser are selected to attach messages to message boards.

The categories module 46 may be configured to manage the categories on system 10. This may include adding, deleting, and/or editing categories across system, 10. The management of the categories may include associating content (e.g., content received from external information sources 14), users, achievements, certificates, messages, groups, and/or other aspects of the social network with categories. The grouping of content (e.g., content received from external information sources 14), users, achievements, certificates, messages, groups, and/or other aspects of the social network may be performed automatically by categories module 46, by system administrators, and/or by the users themselves.

Figure 7:
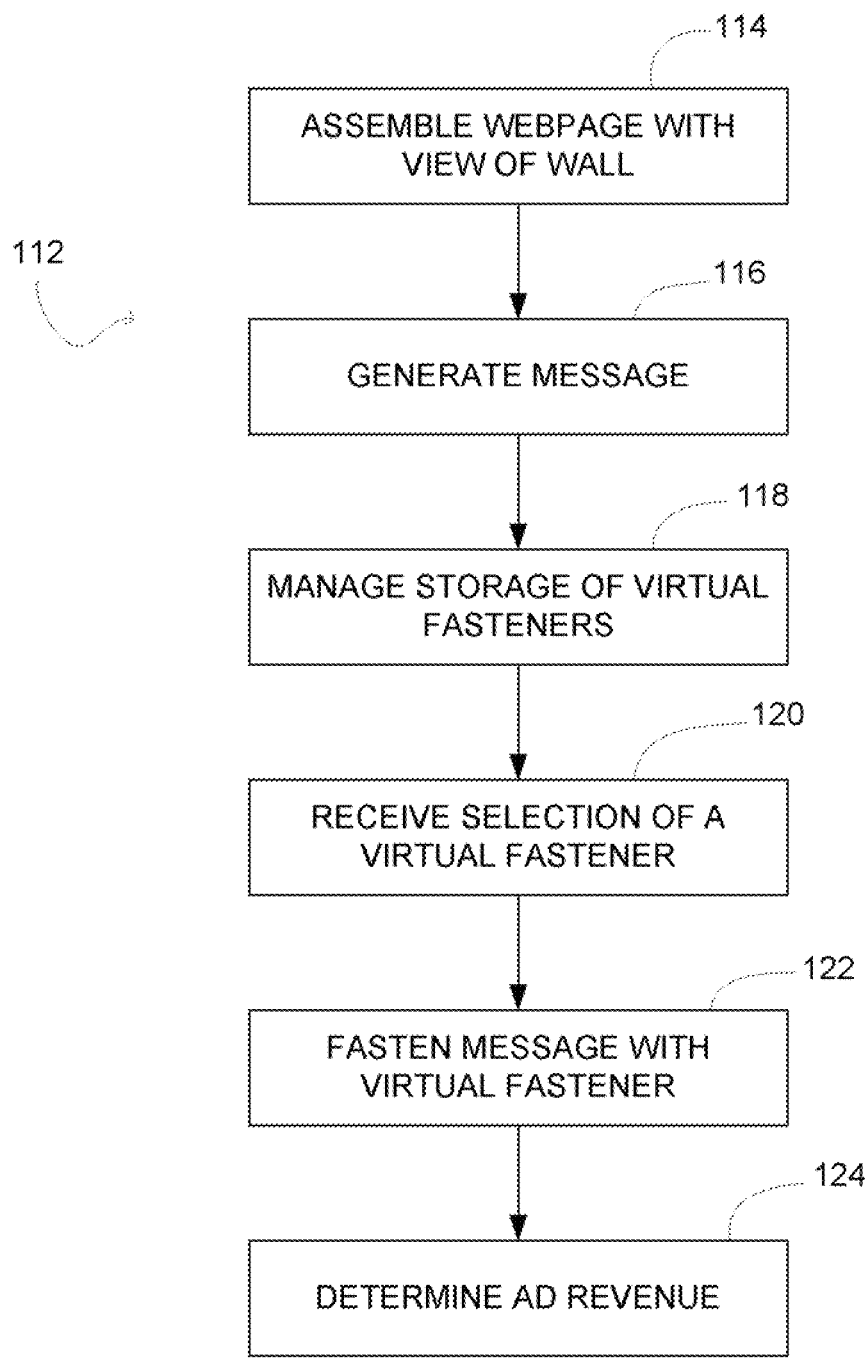
FIG. 7 illustrates a method of hosting a social networking website, in accordance with one or more embodiments of the invention.

FIG. 7 illustrates a method 112 of hosting a social network. The operations of Method 112 presented below are intended to be illustrative. In some embodiments, method 112 may be accomplished with one or more additional operations not described, and/or without one or more of the operations discussed. Additionally, the order in which the operations of method 112 are illustrated in FIG. 7 and described below is not intended to be limiting.

In some embodiments, method 112 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 112 in response to instructions stored electronically on an electronic storage medium. The one or more processing devices may include one or more devices configured through hardware, firmware, and/or software to be specifically designed for execution of one or more of the operations of method 112.

At an operation 114, a webpage may be assembled defining a view of a wall associated with at first user. The wall may include a message board on which other users can leave messages for the first user. In some implementations, operation 114 may be performed by a similar to or the same as user wall module 24 (shown in FIG. 1 and described above).

At an operation 116, commands may be received from a second user over a network to generate a message to the first user. A representation of the message defined by the assembled webpage may have a finite size and boundaries, and content entered by the second user. In some implementations, operation 116 may be performed by a message creation module similar to or the same as message creation module 38 (shown in FIG. 1 and described above).

At an operation 118, the storage of a plurality of virtual fasteners may be managed. The virtual fasteners may correspond in appearance to one or more real world objects configured to hold messages in place. A given virtual fastener may include content defined by an advertiser and/or may be associated with a uniform resource locator defined by the advertiser. In some implementations, operation 118 may be performed by a message fastening module similar to or the same as message fastening module 40 (shown in FIG. 1 and described above).

At an operation 120, selection by the second user of one of the stored virtual fasteners may be received over the network. In some implementations, operation 120 may be performed by a message fastening module similar to or the same as message fastening module 40 (shown in FIG. 1 and described above).

At an operation 122, responsive to the selection of the virtual fastener received at operation 120, the generated message is represented in the view of the wall of the first user as being fastened to the message board of the first user. In some implementations, operation 122 is performed by a message fastening module similar to or the same as message fastening module 40 (shown in FIG. 1 and described above) in coordination with a user wall module similar to or the same as user wall module 24 (shown in FIG. 1 and described above).

In some implementations, adjusting the view of the wall of the first user at operation 122 may include assembling the webpage that defines the wall of the first user such that the view of the webpage defined by the webpage includes the selected virtual fastener holding the generated message to the message board. The webpage may further be adjusted such that selection of the virtual fastener by a user viewing the message board results in a client computing platform on which the user is viewing the message board requesting information from the uniform resource locator associated with the virtual fastener.

At an operation 124, an amount of money the advertiser associated with the virtual fastener owes may be determined. This determination may be based on the selection of the virtual fastener at operation 120. In some implementations, operation 124 may be performed by a advertiser account module similar to or the same as advertiser account module 44 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to host a social network, the system comprising:
 a server configured to host webpages that define views of the social network, and to transmit the webpages to client computing platforms that request the webpages over a network, the server being configured to execute computer program modules, the computer program modules comprising:
 a user wall module configured to assemble webpages defining views of walls associated with individual users, wherein the walls of the individual users include message boards comprising an area on which users can post messages for each other such that on the wall of a given user, users other than the given user can post messages for the given user;
 a message creation module configured to enable users to generate messages that can be posted on message boards, wherein in the webpages assembled by the user wall module, representations of the messages created by users via the message creation module are defined as having a finite size and boundaries, and content that has been entered by users; and a message fastening module configured to enable users to fasten generated messages to selected message boards with a virtual fastener, wherein the message fastening module manages the storage of a plurality of virtual fasteners that are provided to users generating messages via the message creation module, wherein the virtual fastener is an object that (i) corresponds in appearance to a real world object configured to hold messages in place, (ii) includes advertising content defined by an advertiser, and (iii) is associated with a uniform resource locator defined by the advertiser, wherein the message fastening module is configured to:

receive a selection, by a user, of one of the plurality of virtual fasteners, wherein the virtual fastener, the virtual fastener advertising content, and uniform resource locator are shown as being separate from and secondary to the content of the generated message, the generated message being the primary interaction between users;

receive a selection, by a user, of a location at which to post a message generated via the message creation module within the area of a message board; and adjust a view of an appropriate wall comprising the message board to include the generated message posted with the selected one of the plurality of virtual fasteners at the selected location, wherein the selected location corresponds to a point of fastening of the generated message to the area of the message board such that the generated message is represented in the view of the appropriate wall defined by a webpage assembled by the user wall module as being fastened to the area of the message board in the view of the appropriate wall by the selected virtual fastener.

2. The system of claim 1, wherein the user wall module is configured to generate the webpage defining the view of the appropriate wall that includes the one of the plurality of virtual fasteners holding the generated message to the message board of the wall such that selection of the one of the plurality of virtual fastener by a user viewing the view of the wall via a client computing platform based on the generated webpage, the client computing platform automatically requests information from the uniform resource locator associated with the selected one of the plurality of virtual fasteners.

3. The system of claim 1, wherein the plurality of virtual fasteners correspond in appearance to one or more of a pushpin, a thumbtack, a magnet, a piece of tape, or a sticker.

4. The system of claim 1, wherein message boards in the walls represented in the webpages defined by the user wall module correspond in appearance to one or more of a cork board, a refrigerator, a white board, or a tack board.

5. The system of claim 1, wherein the computer program modules further comprise an advertiser account module configured to determine an amount of money that an advertiser owes based on the use of virtual fasteners associated with the advertiser used in the social network, wherein the user is not required to pay a fee to use the virtual fastener associated with the advertiser.

6. The system of claim 5, wherein the advertiser account module is configured such that the amount of money that the advertiser owes is based on the number of virtual fasteners associated with the advertiser that are selected to attach messages to message boards on the social network.

7. The system of claim 5, further comprising a user ratings module configure to enable users to rate each other, and wherein the advertiser account module is configured such that the amount of money that the advertiser owes is based on the ratings of users on whose walls virtual fasteners associated with the advertiser are selected to attach messages to message boards on the social network.

8. The system of claim 1, wherein:
the message creation module is further configured to provide a message definition interface that includes controls to enable the users to generate the messages that can be left on the selected message boards;
the message definition interface includes a title field and a body field that are configured to receive the content that has been entered by the users to generate the messages;
the content is on the plurality of virtual fasteners such that the content is viewable by the users and includes an image defined by the advertiser; and
the uniform resource locator is associated with the advertiser that defined the image on the virtual fasteners.

9. The system of claim 8, wherein the computer program modules further comprise an advertiser account module configured to determine an amount of money that the advertiser owes based on the selection of the one of the plurality of virtual fasteners associated with the advertiser by the user.

10. A method of hosting a social network, wherein the method is implemented in a server configured to host web pages that define views of the social network, and to transmit the webpages to client computing platforms that request the webpages over a network, the server comprising one or more processors configured to execute one or more computer program modules, the method comprising:

executing, on the one or more processors of the server, one or more computer program modules configured to assemble a webpage defining a view of a wall associated with a first user, wherein the wall of the first user includes message boards comprising an area on which other users can post messages for the first user;

executing, on the one or more processors of the server, one or more computer program modules configured to receive, over a network, commands from a second user to generate a message to the first user, wherein the assembled webpage defines a representation of the message created by the second user as having a finite size and boundaries, and content that has been entered by the second user;

executing, on the one or more processors of the server, one or more computer program modules configured to manage the storage of a plurality of virtual fasteners that are provided to second user, wherein a virtual fastener is an object viewable in the assembled webpages that (i) corresponds in appearance to a real world object configured to hold messages in place, (ii) includes advertising content defined by an advertiser, and (iii) is associated with a uniform resource locator defined by the advertiser; executing, on the one or more processors of the server, one or more computer program modules configured to receive, over the network, selection by the second user of one of the plurality of virtual fasteners and a location within the area of a message board at which to post a generated message, wherein the virtual fastener, the virtual fastener advertising content, and uniform resource locator are shown as being separate from and secondary to the content of the generated message, the generated message being the primary interaction between users; and executing, on the one or more processors of the server, one or more computer program modules configured such that, responsive to the selection of one of the plurality of virtual fasteners and the location within the area by the second user, the generated message is represented in the view of the wall of the first user as being fastened to the message board by the selected one of the plurality of virtual fasteners at the selected location within the area of the message board, wherein the selected location corresponds to a point of fastening of the generated message to the area of the message board.

11. The method of claim 10, wherein the one or more computer program modules configured to assemble the webpage defining the view of the wall associated with the first user assemble the webpage to define the view as including a representation of the selected one of the plurality of virtual fasteners holding the generated message to the message board of the wall, and to define the selected one of the plurality of virtual fasteners such that, responsive to selection of the one of the plurality of virtual fasteners by a user viewing the wall via a client computing platform based on the assembled webpage, the client computing platform will automatically request information from the uniform resource locator associated with the selected one of the plurality of virtual fasteners.

12. The method of claim 10, wherein the plurality of virtual fasteners correspond in appearance to one or more of a pushpin, a thumbtack, a magnet, a piece of tape, or a sticker.

13. The method of claim 10, wherein message board in the wall represented in the webpage corresponds in appearance to one or more of a cork board, a refrigerator, a white board, or a tack board.

14. The method of claim 10, further comprising executing, on the one or more processors of the server, one or more computer program modules configured to determine an amount of money that the advertiser associated with the selected virtual fastener owes based on the selection of the selected virtual fastener by the second user.

15. The method of claim 14, wherein the amount of money that the advertiser owes is based on the number of virtual fasteners associated with the advertiser that are selected to attach messages to message boards on the social network.

16. The method of claim 14, further comprising executing, on the one or more processors of the server, one or more computer program modules configured to enable users to rate each other, and wherein the amount of money that the advertiser owes is based on the rating of the first user by other users.

17. An online messaging system comprising:
a network accessible computer configured to execute computer program instructions, comprising:
a first set of instructions to cause the computer to generate a representation of a first message board associated with a first user, wherein the first message board comprises an area and is configured to display messages in the area of the message board received over the network, including a first message from a second user;
a second set of instructions configured to receive a selection, by the second user, of a first virtual fastener from a set of virtual fasteners, wherein a virtual fastener is an object that (i) corresponds in appearance to a real world object configured to hold messages in place, (ii) includes advertising content defined by an entity other than the first user or the second user, and (iii) is associated with a uniform resource locator defined by the entity, wherein the selected first virtual fastener, the virtual fastener advertising content, and uniform resource locator are shown as being separate from and secondary to content of the first message from the second user, the first message being the primary interaction between users; and
a third set of instructions configured to receive a selection, by the second user, of a location within the area of the first message board at which to post the first message, wherein the selected location corresponds to a point of fastening of the first message to the area of the first message board, wherein responsive to receipt of the selection by the second user of the first virtual fastener and the location, in connection with the first message, the second and third set of instructions cause the first message to be represented as being fastened to the area of the first message board by the first virtual fastener.

18. The system of claim 17, wherein:
the first virtual fastener corresponds in appearance to one or more of a pushpin, a thumbtack, a magnet, a piece of tape, or a sticker;
the content is on the virtual fastener such that the content is viewable by the first user viewing the first message board and includes an image defined by the entity; and
the uniform resource locator is associated with the entity that defined the image on the virtual fastener.

19. An online messaging system comprising:
a network accessible computer configured to execute computer program instructions, comprising:
a first set of instructions to cause the computer to generate a representation of a first message board associated with a first user, wherein the first message board comprises an area and is configured to display multimedia content in the area of the message board received over the network, including a first multimedia content from a second user, the second user associated with a second message board and having access to but not associated with the first message board; and
a second set of instructions configured to receive a selection, by the second user, of a first virtual fastener from a set of virtual fasteners, wherein a virtual fastener is an object that (i) corresponds in appearance to a real world object configured to hold multimedia content in place, (ii) includes content defined by an entity other than the first user or the second user, and (iii) is associated with a uniform resource locator defined by the entity, and wherein the selected first virtual fastener, the virtual fastener advertising content, and uniform resource locator are shown as being separate from and secondary to the fastened multimedia content, the fastened multimedia content being the primary interaction between users; and
a third set of instructions configured to receive a selection, by the second user, of a location within the area of the first message board at which to post the multimedia content, wherein the selected location corresponds to a point of fastening of the multimedia content to the area of the first message board, wherein responsive to receipt of a selection by the second user of the first virtual fastener and the location within the area, in connection with the first multimedia content, the second and third set of instructions cause the first multimedia content to be represented as being fastened to the area of the first message board by the first virtual fastener.

\* \* \* \* \*